Sept. 22, 1959 F. V. TADDEO 2,905,887
COMPARISON CIRCUIT
Filed May 5, 1955
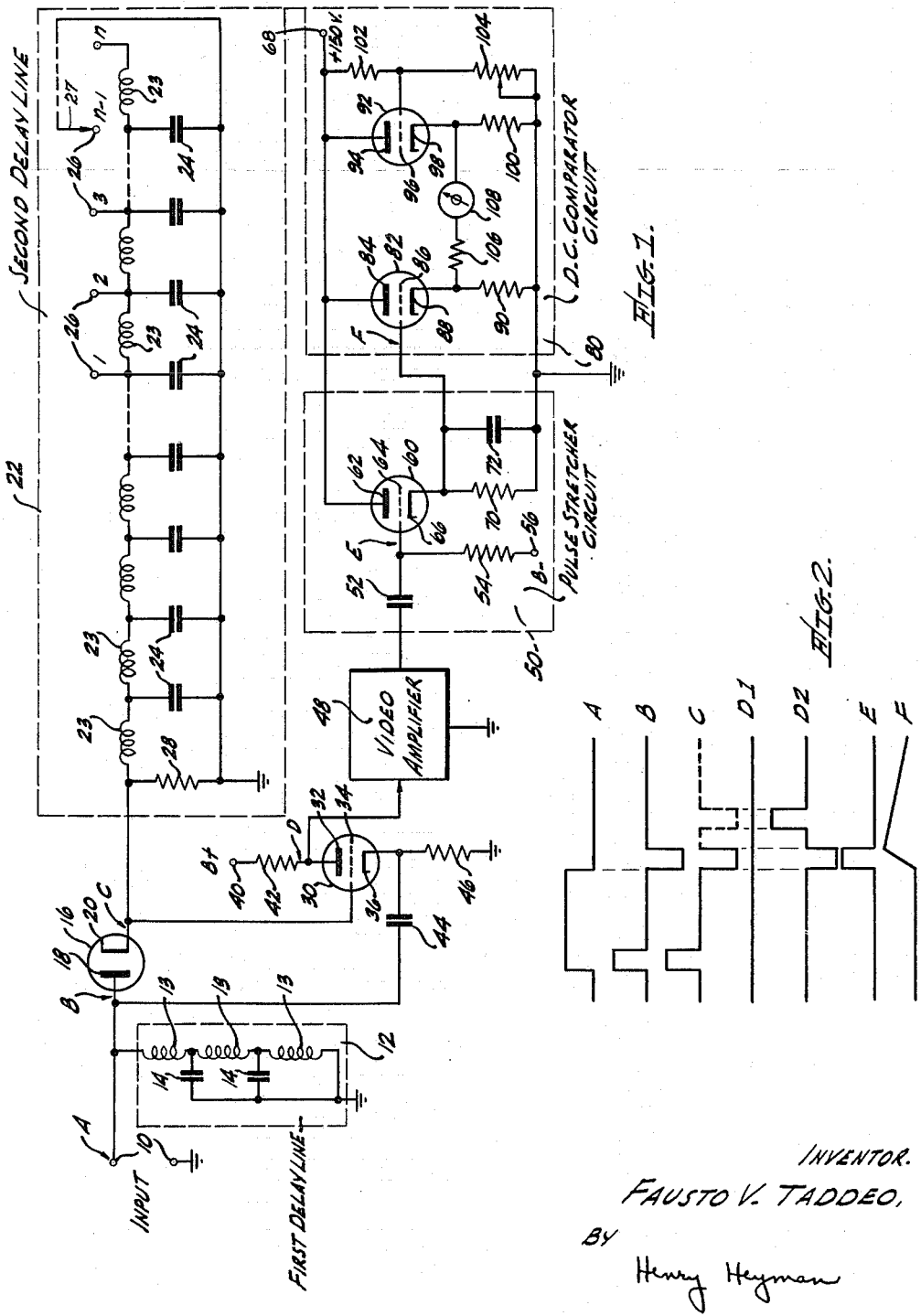
INVENTOR.
FAUSTO V. TADDEO,
BY
Henry Heyman
ATTORNEY.

United States Patent Office 2,905,887
Patented Sept. 22, 1959

2,905,887

COMPARISON CIRCUIT

Fausto V. Taddeo, Los Angeles, Calif., assignor to Hughes Aircraft Company, Culver City, Calif., a corporation of Delaware Application May 5, 1955, Serial No. 506,309

7 Claims. (Cl. 324—68)

This invention relates to comparison circuits, and particularly to circuits for comparing pulse widths.

Many systems, such as radar systems, utilize devices which detect pulses having widths or durations equal to a predetermined standard. It is also sometimes desired to detect the occurrence in pulse duration modulated information of pulses of a predetermined width. The devices heretofore known for making such comparisons have required considerable equipment or have been limited to handling certain restricted types of signals. For example, these devices have required that the pulses to be compared be coincident in time, or of substantially like amplitude, or of considerable duration. Such devices have utilized complex and expensive equipment in overcoming these limitations. There is therefore a need for a circuit which will compare pulses to a predetermined and selectable standard duration, even though the pulses may be very short, of various amplitudes, and occurring randomly in time.

Therefore, it is the object of this invention to provide an improved device for comparing pulse widths to a predetermined standard.

It is another object of this invention to provide an improved comparison circuit, simpler than those heretofore known, for detecting signals of predetermined duration.

It is yet another object of this invention to provide an improved circuit for comparing the width of pulses occurring randomly in time to a selectable width.

It is still another object of this invention to provide an improved device simpler than devices heretofore known and operable with pulses of very short duration and nonstandard amplitude, for detecting pulses of selectable width.

A pulse width comparison circuit constructed in accordance with the invention may compare an input pulse with a standard of selectable value. An incoming pulse is applied to a first delay line so arranged that the leading and trailing edges of the pulse are used to form pulses of opposite polarity. The pulse from the leading edge only is applied through a rectifier to a second reflecting delay line. The second delay line is adjustable and provides a reflected pulse of opposite polarity after a selectable interval. The selectable interval establishes the standard pulse width to be detected. The width of the incoming pulse is the same as the standard if the pulse formed from the trailing edge by the first delay line coincides in time with the reflected pulse provided from the second delay line. Lack of coincidence between the two pulses may be detected by an amplifier responsive to voltage differences across the rectifier. A null condition signifies that the incoming pulse is of the desired width or duration. An indication of signal relationships may be provided by a peak detecting circuit employed to operate an indicating meter.

The novel features of the invention, as well as the invention itself, both as to its structure and method of operation, will best be understood when considered in the light of the following description, taken together with the accompanying drawing, in which:

Fig. 1 is a schematic representation of an arrangement for practicing the invention, and Fig. 2 is a diagram of idealized waveforms occurring in the operation of the arrangement.

Referring to Fig. 1, input signals may be applied at an input 10 for comparison with a predetermined standard or for determination of pulse width. The input signals are applied to a first electrical delay line 12, comprising a conventional arrangement of lumped or distributed inductance elements 13 and lumped or distributed shunt capacitance elements 14. The terminal inductance 13 of the delay line 12 is connected to ground, providing a reflection arrangement for the delay line 12. The shunt capacitances 14 are coupled to a common, or ground, connection.

The input signals are also applied to the anode 18 of a rectifier 16. The cathode 20 of the rectifier 16 is coupled to a second delay line 22 using an arrangement of lumped or distributed inductances 23 and lumped or distributed shunt capacitances 24 similar to that of the first delay line 12. The second delay line 22 is also arranged to be reflecting, but has a number of selectable tap positions 26 here numbered as positions 1, 2, 3, . . . n, respectively. A movable contact 27 may be positioned at any desired one of the tap positions 26. A shunt resistor 28 terminates the pulse reflected from delay line 22.

The anode or plate 32 of the triode amplifier 30 is coupled to a B+ supply, or source of positive potential, 40 through an anode load resistor 42. The control grid 34 of the amplifier 30 is coupled to a point in the connection between the cathode 20 of the rectifier 16 and the second delay line 22. The cathode 36 is responsive, through a coupling capacitor 44, to the potential at the anode 18 of the rectifier 16. A resistor 46 couples the amplifier cathode 36 to ground.

An inverter amplifier device, such as a video amplifier 48, is coupled to the anode 32 of the triode amplifier 30. The video amplifier may be of the type shown and described at p. 72 of the book "Vacuum Tube Amplifiers," published by the McGraw Hill Book Company, Inc. (1948), vol. 18 of the MIT Radiation Lab Series. The video amplifier 48 provides outputs to a peak detecting circuit, such as a pulse stretcher circuit 50. The pulse stretcher circuit 50 in turn provides signals suitable for use in detection or indication of desired pulse widths. Here, an arrangement is illustrated for manual testing and detection of pulse widths. Thus the pulse stretcher circuit 50 is employed to feed a D.C. comparator 80 which may operate a current indicating meter 108.

The pulse stretcher circuit 50 includes a triode 60 having its anode 62 coupled to a positive supply, here a +150 volt supply 68. The control grid 64 of this second triode 60 is responsive through a coupling capacitor 52 to signals from the video amplifier 48. A grid resistor 54 couples the grid 64 to a B— supply 56, the arrangement holding the second triode 60 cut off in the absence of control signals. The cathode 66 of the second triode 60 is coupled to an integrating circuit comprising a resistor 70 and capacitor 72 coupled in parallel. The integrating resistor 70 and capacitor 72 are coupled at one junction to ground, and at the other junction provide signals for the subsequent D.C. comparator circuit 80.

The D.C. comparator 80 may employ a pair of triodes, here called the third triode 82 and the fourth triode 92. The anodes 84, 94, of the third and fourth triodes 82, 92 are coupled to the +150 volt supply 68. The triode cathodes 88, 98 are each coupled through a different resistor 90, 100, respectively, to ground. The control grid 86 of the third triode 82 receives input signals for the D.C. comparator 80 from the previously mentioned integrating circuit. The control grid 96 of the fourth triode 92 is responsive to signals from an adjustable voltage divider comprising a fixed resistor 102 and an adjustable resistor 104 in series. The control grid 96 is coupled to the midpoint between the series connected resistors 102, 104.

Visual signal indications are provided in the present arrangement by a current indicating meter 108 coupled between the cathodes 88, 98 of the third and fourth triodes 82, 92. A resistor 106 is used in the coupling between the meter 108 and the cathode 88 of the third triode 82.

In operation, referring now to Fig. 1, the arrangement shown may be employed for the testing of input signals. The arrangement may operate in two general modes, in one of which it compares incoming pulses to a predetermined standard, and in a second of which it determines pulse width or duration on a calibrated scale.

Incoming signals are applied to the input 10. A waveform idealized for clarity of description occurring at the input 10 is shown in Fig. 2 as rectangular pulse A. The system may operate with pulses of the order of a fraction of a microsecond, so that incoming pulse A may be less than a microsecond in duration. Assume here that the incoming pulse is one of a series of like pulses, to be employed in determining width or duration, either for measuring purposes, or as a standard to the comparison of other pulses. Note that if the pulses are to be measured, the tap positions 26 of the second delay line 22 should be calibrated to indicate either pulse width or duration.

Incoming pulses applied at the input 10 are directed to the first delay line 12. After a time delay dependent upon the values in the elements of the delay line 12 the leading edge of the pulse is reflected back from the shorted terminal of the first delay line 12. In the present example the one way delay time of the first delay line 12 may be .05 microsecond. Thus, 0.1 microsecond after the application of the leading edge of the input pulse the reflected wave is provided from the first delay line 12 to point B in Fig. 1. The reflected wave is superposed upon the incoming pulse, and effectively cancels the major portion of the input pulse. The result at point B of Fig. 1 is shown in idealized form as waveform B in Fig. 2. Waveform B illustrates that a pulse is formed from the leading edge of the incoming pulse, that the major portion of the incoming pulse is cancelled by the superposed reflected wave, and that the reflected wave provides a negative pulse of short duration from the trailing edge of the input pulse. As is well understood, the reflected wave from the delay line is opposite in phase to the incoming wave. Further, the reflected wave is of almost the same amplitude, so that cancellation of the incoming wave or input pulse is substantially complete.

The short positive pulse occurring at point B, referring again to Fig. 1, is applied to the anode of the rectifier 16, which is so poled as to pass only positive pulses. The positive pulse therefore is applied to the second delay line 22, which reflects a negative pulse at a selectable time interval following the occurrence of the positive pulse. The selectable time interval is determined by the setting of the movable contact 27 with regard to the tap positions 26 of the second delay line 22. If the total delay in the second delay line 22 is the same as the duration of the incoming pulse, the negative reflected pulse at point C will coincide in time with the negative pulse at point B of Fig. 1. The waveform occurring at point C of Fig. 1 will in such case correspond to that at point B. Such a relationship is illustrated by the solid line waveform C in Fig. 2, when considered with respect to waveform B. If the reflected pulses from the delay lines 12, 22 do not coincide in time, the negative reflected pulse at point C of Fig. 1 may occur earlier than that at point B, or later, as illustrated by the dotted line negative pulse at C of Fig. 2. The second delay line 22 in the present example may have a minimum one way time delay of .25 microsecond. As with the first delay line 12, the reflected pulse is slightly diminished in amplitude, but the diminution is not sufficient to affect subsequent signal detection.

A comparison of waveforms B and C in Fig. 2 thus shows relationships which may exist in the detection or comparison of pulse widths. If the negative pulses in waveforms B and C coincide in time the incoming pulse is of the selected duration or has been properly measured, depending upon the mode of operation of the system. The detection of coincidence in time between these negative pulses is here employed, by way of illustration, to provide a detectable null condition. The triode amplifier 30 coupled to the rectifier 16 in effect detects the voltage potential across the rectifier 16. The remainder of the system operating from the triode amplifier 30 is responsive only to negative variations at the anode 32 of the triode amplifier 30. If substantially alike negative signals are provided simultaneously at both points B and C in Fig. 1 a voltage null exists across the rectifier 16 and also between the grid 34 and the cathode 36 of the triode amplifier 30. During such time the anode 32 of the triode amplifier 30 has no voltage variation, and a null condition exists. The null condition is detected and distinguished from the opposite condition by the associated circuitry in a manner described below. For the null condition the voltage at point D in Fig. 1, which is the voltage on the anode 32 of the triode amplifier 30, is shown in idealized form as waveform D1 in Fig. 2.

If the negative pulses from the two delay lines 12, 22 are not coincident in time a negative signal will be derived at point D in Fig. 1. Assume that the second delay line 22 provides a delay greater than the duration of the incoming pulse. The negative pulses thus bear the relation of the dotted line negative pulse in waveform C of Fig. 2 to the negative pulse in waveform B. With such a relationship a waveform (idealized) similar to waveform D2 in Fig. 2 will be provided at point D in Fig. 1 The negative pulse from the first delay line 12 is in this instance applied first in time to the cathode 36 of the triode amplifier 30. The anode 32 and point D drop in potential in response to the decrease at the cathode 36, thus providing a negative output signal to be detected by the remainder of the system. The following negative pulse from the second delay line 22 acts to increase the potential at point D, but as is described below a positive pulse from the triode amplifier 30 has no effect.

If the negative pulses from the delay lines 12, 22 were reversed in time from the example just given the signal sequence of point D would likewise have been reversed. That is, point D would first have undergone a variation in a positvie direction, and then a variation in the negative direction.

If the two negative pulses overlap, a null condition is provided during the period of overlap. The same signal variations at point D result, however, from the independently existing portions of the negative signals. The difference is that the overlap decreases the width of the negative pulse provided at point D. It may be seen further that the positive pulse from the leading edge of the incoming pulse tends to raise the potential of both the cathode 36 and the grid 34 of the triode amplifier 30. Because of a slight drop in potential across the rectifier 16, however, no negative signal is derived at point D.

The remainder of the system operates to detect and indicate the determinative negative variations at the anode 32 (point D) of the triode amplifier 30. The video amplifier 48 inverts negative signals to provide positive pulses for the pulse stretcher circuit 50, which is one form of peak detector. The second triode 60 employed in the pulse stretcher circuit 50 is normally cut off because of the bias applied to the grid 64 from the B— source 56 through the grid resistor 54. The second triode 60 is therefore not responsive to negative pulses. When a short positive pulse is applied to the grid 64 through the coupling capacitor 52, however, the second triode 60 conducts briefly but heavily. The resistor 70 acts, with the coupled integrating capacitor 72, to provide an integrating action and the desired pulse stretching effect. The capacitor 72 is charged briefly to a high level during the brief conducting period of the second triode 60, and discharges, providing the desired pulse stretching effect. Waveforms, again idealized, for points E and F in Fig. 1 are shown as curves E and F in Fig. 2. The output of the integrating circuit is the signal detected in the present example by the D.C. comparator 80 and current meter 108 arrangement.

The D.C. comparator 80 is adjustable to compensate for amplitude differences in the incoming pulses, thus to provide sensitivity over a wide range of values. The third and fourth triodes 82, 92 are maintained conducting. The meter 108 is responsive to changes in cathode 88, 98 conditions. The resistor 106 coupled to the meter 108 acts to limit current flow through the meter 108 and to protect the meter 108. Bias applied to the grid 96 of the fourth triode 92 is adjustable through use of the variable voltage divider chain 102, 104. Because the integrating capacitor 72 is responsive both to the amplitude and duration of the pulses applied to it, the D.C. comparartor 80 is provided with signals which may vary over a wide range. Thus the variable voltage divider chain 102, 104 may be used to compensate for pulse amplitudes applied to the system. In a typical case a sequence of pulses of like amplitude and duration may be applied for testing purposes, and the D.C. level adjustment made during the period of these pulses. The stretched pulse derived from the integrating circuit, therefore, is applied to the grid 86 of the third triode 82 and raises the potential of the grid 86 and cathode 88 of the third triode 82. A current flow occurs between the cathodes 88, 98 of the third and fourth triodes 82, 92 through the current indicating meter 108. A visual indication therefore results that the duration of the pulse tested is not matched by the standard set by the second delay line 22.

An operator may thus quickly detect the condition in which pulses are set to or matched against a predetermined standard. With a calibrated second delay line 22 an operator need only watch the meter 108 and adjust the second delay line 22 to determine the width or duration of a sequence of like incoming pulses. When, after adjustment of the second delay line, the meter 108 provides a minimum reading, the pulse width has been determined. If, on the other hand, a series of incoming pulses is applied and the second delay line 22 has already been set to some predetermined value, observation that the meter 108 is not in a null condition is sufficient to indicate that the incoming pulses are in the desired width.

The system as shown is suitable for a controllably operable signal testing, detecting, and comparing system. Various modifications will be apparent to those skilled in the art. Pulses may be formed from the leading and trailing edges of an incoming pulse, for example, by a differentiating circuit, rather than the first delay line 12. It will also be understood that actual waveforms may vary considerably from the idealized forms of Fig. 2. Because a null condition is detected, however, the system nonetheless provides an accurate and reliable indication with very short pulse widths. The system is also operable with pulses of longer duration than those described here, although the same accuracy is preserved. If desired, gating arrangements well known in digital computing systems may be employed to detect the coincidence of negative signals from the two delay lines 12, 22. Such arrangements may provide positive signal indications, rather than null detection, of the comparison of input signals and a selected or predetermined standard.

Thus there has been described a simple and efficient device for comparing pulse width or duration to selectable standards. The device is sensitive, accurate, and operable with pulses of very short duration.

What is claimed is:

1. A circuit for pulse width comparison comprising means responsive to the leading and trailing edges of an input pulse for forming therefrom a leading edge pulse of a given first polarity and a trailing edge pulse of a second opposite polarity, means coupled to said means for forming pulses and responsive to said leading edge pulse for providing at a predetermined interval a pulse of said second polarity, and means responsive to the means for forming pulses and the means for providing a pulse and coupled to both said means for detecting coincident pulses of said second polarity.

2. A circuit for pulse width comparison comprising means responsive to the leading and trailing edges of an input pulse for forming therefrom a leading edge pulse of a given first polarity and a trailing edge pulse of a second, opposite polarity, means coupled and responsive to said means for forming pulses for detecting pulses of said first polarity, adjustable delay means coupled and responsive to said detecting means for providing at a selectable interval a pulse of said second polarity, and means responsive to the means for forming pulses and the means for providing a pulse and coupled to both said means for detecting coincident pulses of said second polarity.

3. A circuit for comparing the time duration of an input pulse with a selectable interval comprising a first reflecting delay line responsive to said input pulse to form a pulse of a first polarity at the beginning thereof and a pulse of a second, opposite, polarity at the end thereof, a second adjustable reflecting delay line for providing a pulse of said second polarity at a selectable time interval in response to a pulse of said first polarity, a rectifier coupling said first to said second delay line for applying pulses of said first polarity from said first to said second delay line, and means coupled to said first and second delay lines for detecting coincident pulses of said second polarity.

4. A circuit for comparing the time duration of an input pulse with a selectable interval comprising means responsive to said input pulse to form a pulse of a first polarity from the beginning thereof and a pulse of a second, opposite, polarity from the end thereof, an adjustable reflecting delay line for providing a pulse of said second polarity at a selectable time interval in response to a pulse of said first polarity, rectifying means coupling said means for forming pulses to said delay line for applying pulses of said first polarity from said means for forming pulses to said delay line, means coupled to said rectifying means for providing an output on the non-coincident occurrence of pulses of said second polarity from said means for forming pulses on said delay line, and means responsive to said amplifying means for indicating non-coincident occurrence of pulses of said second polarity.

5. A circuit for comparing the time duration of an input pulse with a selectable interval comprising means responsive to said input pulse to form a pulse of a first polarity from the beginning thereof and a pulse of a second, opposite polarity from the end thereof, an adjustable reflecting delay line for providing a pulse of said second polarity at a selectable time interval in response to a pulse of said first polarity, rectifying means coupling said means for forming pulses to said delay line for applying pulses of said first polarity from said means for forming pulses to said delay line, electron discharge device amplifying means having at least an anode, cathode, and control electrode, said cathode being coupled to said means for forming pulses said control electrode being coupled to said delay line, and said amplifying means providing an output on non-coincident occurrence of pulses of said second polarity, means responsive to outputs of said amplifying means for providing signals of increased time duration from the outputs of said amplifying means, and detecting means responsive to said signals of increased time duration.

6. A circuit for comparing the time duration of a positive input pulse with a selectable interval comprising a first reflecting delay line responsive to said input pulse to form a positive pulse from the leading edge thereof and a negative pulse from the trailing edge thereof, a second, adjustable, reflecting delay line for providing a negative pulse at a selectable time interval in response to a positive pulse, a rectifier coupling said delay lines for applying positive pulses from said first to said second delay lines, an electron discharge device amplifier having at least anode, cathode, and control grid, the cathode of said amplifier being coupled to said first delay line and the control grid of said amplifier being coupled to said second delay line, said amplifier providing a negative output signal at said anode on non-coincident occurrence of negative signals from said first and second delay lines, inverter amplifier means responsive to negative output signals from said amplifier, integrating means responsive to said inverter amplifier means for stretching pulses derived from said inverter amplifier means, adjustable D.-C. comparator means responsive to said integrating means for comparing signals provided from said integrating means to selectable standards, and signal indicating means responsive to said D.-C. comparator means for determining the existence of a null signal condition.

7. A circuit for comparing the time duration of a positive input pulse with a selectable interval comprising a first electrical delay line arranged to be reflective and responsive to said input pulse to form a positive pulse from the leading edge thereof and a negative pulse from the trailing edge thereof, a second, adjustable, electrical delay line arranged to be reflective for providing a negative pulse at a selectable time interval in response to a positive pulse, a rectifier coupling said delay lines and so poled as to apply positive pulses from said first to said second delay lines, a triode amplifier having anode, cathode, and control grid, the cathode of said amplifier being coupled to said first delay line and the control grid of said amplifier being coupled to said second delay line, said amplifier providing a negative output signal at said anode on non-coincident occurrence of negative signals from said first and second delay lines, inverter amplifier means coupled to said amplifier for providing positive output signals in response to negative output signals at said amplifier, a first electron discharge device having at least an anode, cathode, and control grid, arranged to be non-conducting in the absence of a positive signal on said control grid and responsive to positive output signals at said inverter amplifier means, an integrating circuit coupled to the cathode of said first electron discharge device, a signal comparator circuit comprising second and third electron discharge devices arranged in parallel, said second electron discharge device being responsive to signal variations at said integrating circuit, said signal comparator circuit also including means to adjustably bias said third electron discharge device; and current responsive means coupling said second and third electron discharge devices for indicating the relationship of signals applied to said devices, thereby to indicate the comparison relationship of an input pulse to said selectable interval.

References Cited in the file of this patent

UNITED STATES PATENTS

| | | |
|---|---|---|
| 2,444,438 | Grieg | July 6, 1948 |
| 2,546,371 | Peterson | Mar. 27, 1951 |
| 2,623,106 | Fassberg | Dec. 23, 1952 |